May 2, 1950 E. L. SCHOFIELD 2,505,794
CLUTCH FOR LAWN MOWER REELS
Filed Feb. 15, 1945 2 Sheets-Sheet 2
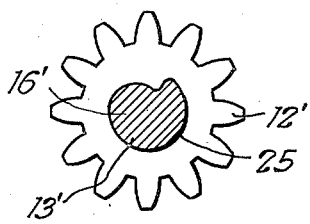
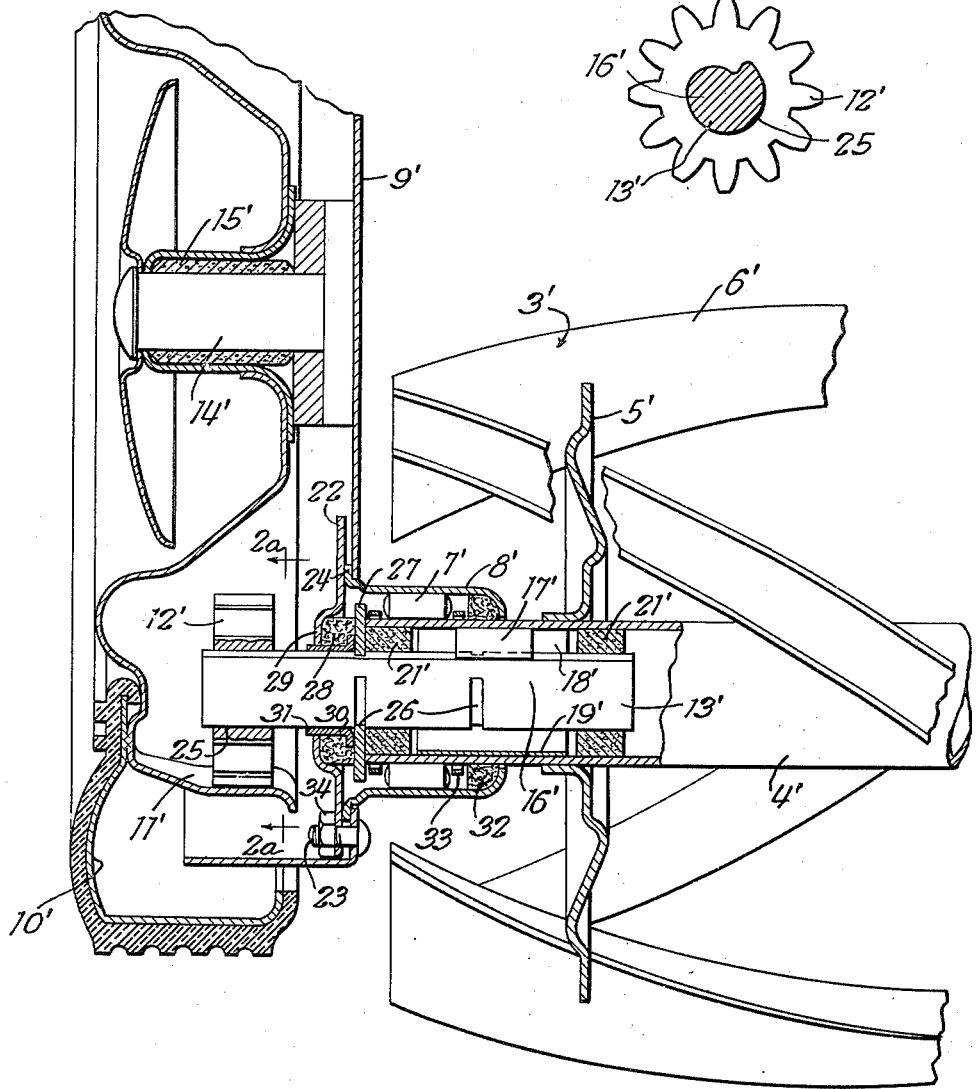
Inventor
Earl L. Schofield Patented May 2, 1950

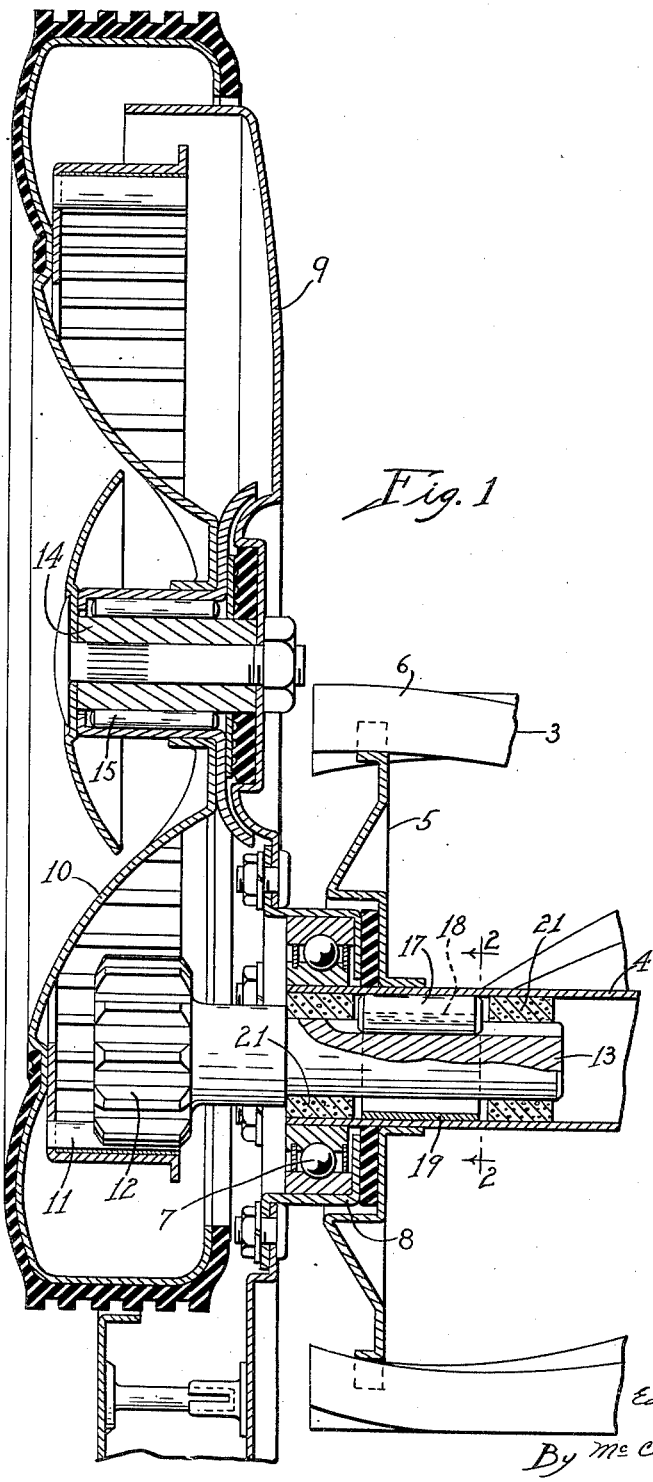
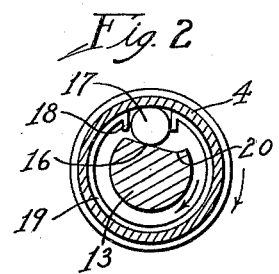

2,505,794

UNITED STATES PATENT OFFICE 2,505,794

CLUTCH FOR LAWN MOWER REELS

Earl L. Schofield, Rockford, Ill., assignor, by mesne assignments, to Andrew F. Wintercorn, Rockford, Ill.

Application February 15, 1945, Serial No. 580,032

19 Claims. (Cl. 192—45)

This application is a continuation in part of my co-pending application Serial No. 488,485, filed May 26, 1943, and now abandoned and replaces the divisional application Serial No. 516,190, filed December 30, 1943, and allowed August 26, 1944 and now abandoned.

This invention relates to a new and improved clutch for a lawn mower reel.

The principal object of my invention is to provide an overrunning clutch of simple, economical, and practical construction, and one which operates smoothly and quietly and without objectionable concentration of wear at certain points, whereby to avoid the most important objection to the conventional ratchet drive heretofore employed. The ratchet teeth on the inside of the hub of the pinion in the conventional ratchet drive are subjected to severe hammering by the pawl and, as a result, get rounded or chipped off to such an extent that the pawl no longer takes hold properly and the reel is not driven satisfactorily. With my improved type of overrunning clutch, there are no teeth to get chipped or rounded and the single cylindrical roller used affords positive and yet quiet engagement without any tendency toward hammering, and the clutch provides large wearing surfaces, and since the engagement does not occur always at certain specific points much longer life is secured.

Another object of the invention is to provide a drive of the kind mentioned, using an extruded shaft to provide the cam contour for the overrunning clutch, the shaft being formed to the same cross-section from end to end, requiring no special expensive machining to get the cam contour and no separate machining of a keyway for keying the shaft to the drive pinion.

Still another object is to provide a drive of the kind mentioned in which an annular groove is provided in the shaft intermediate the ends thereof and a brass washer is swedged into the groove to assume end thrust, this washer cooperating preferably with a felt washer assembled inside a closure plate, whereby the drive is completely sealed and there is ample end tolerance, making for free and easy operation with minimum wear, and also quick and easy assembling and disassembling.

The invention is illustrated in the accompanying drawings, in which—

Fig. 1 is a substantially horizontal sectional detail through the reel drive portion of a lawn mower embodying the clutch of my invention;

Fig. 2 is a cross-section on the line 2—2 of Fig. 1.

Fig. 1A is a section similar to Fig. 1, showing another construction, and

Fig. 2A is a cross-section on the line 2a—2a of Fig. 1A.

Similar reference numerals are applied to corresponding parts in these views.

Referring first to Figs. 1 and 2, the reference numeral 3 designates the reel which comprises a tubular center shaft 4 onto which are welded sheet metal disks 5 for support of the reel blades 6, which, of course, cooperate with the usual cutter-bar (not shown). The reel 3 is rotatably mounted by means of its shaft 4 at its opposite ends in ball bearings 7 provided in cups 8 detachably secured to the side plates 9 that form parts of the lawn mower frame. The two wheels of the mower, one of which is shown at 10, carry internal gears 11 which have meshing engagement with drive pinions 12, the shanks 13 of which are entered in the ends of the shaft 4 for drive purposes. The wheels 10 are mounted on axle stubs 14 secured to and projecting outwardly from the side plates 9, the roller bearings 15 insuring easy turning.

The reel 3, in accordance with my invention, is arranged to be driven by an overruning clutch, consisting of a cam 16 formed on the shank 13 of the drive pinion and a single cylindrical roller 17 disposed between the cam 16 and the inner periphery of the shaft 4 and guided for radial movement between the turned-in end portions 18 of a split spring ring 19. The ring 19 tends to expand and regardless of lubricant present will exert sufficient frictional drag to keep the roller 17 from changing its location with respect to the inside of the shaft, besides maintaining the roller in accurate longitudinal alignment with the shank 13 and shaft 4 for full length contact therewith in the engagement of the clutch.

When the shank 13 is turned in a clockwise direction relative to the shaft 4, the roller 17 is cammed outwardly into wedging engagement with the inside of the shaft 4 and the reel is accordingly caused to turn with the pinion 12. However, the moment the reel 3 turns faster than the pinion 12, then the clutch disengages, the roller 17 backing away from the inside of the shaft 4 to the low end 20 of the cam 16, while still guided, of course, between the end portions 18 of the ring 19. Obviously this clutch provides large wearing surfaces and positive and quiet engagement and avoids the objections common to the old ratchet type drive employing either a gravity pawl or a spring pawl. The ordinary overrunning clutch having small coiled compression springs to urge the roller toward engaged position would not be suitable for the present purpose, because of the danger of such springs becoming clogged with dirt and rendered useless, whereas, the spring ring 19 is not easily put out of commission.

These clutches are provided at both ends of the reel and are simple to assemble and disassemble. The bearings indicated at 21 are preferably of the sintered powder type and are suitably fixed in spaced relation to one another in the end portions of the shaft 4, with the rings 19 retained therebetween. In assembling the pinions 12 on the ends of the shaft, the rollers 17 are first placed between the end portions 18 of the rings and then the shanks 13 are entered to hold the rollers 17 in place.

Referring now to Figs. 1A and 2A, 3' designates the reel of another lawn mower having a tubular center shaft 4' carrying sheet metal disks 5' on the periphery of which the reel blades 6' are mounted. Roller bearings 7' support the opposite ends of the shaft 4' and are provided in cups 8' that are detachably secured to the side plates 9' that form parts of the lawn mower frame, closure plates 22 being bolted to these side plates, as shown at 23, to clamp the cups 8' in place by means of their annular flanges 24. The two wheels of the mower, one of which appears at 10', carry internal gears 11' which have meshing engagement with the drive pinions 12' to transmit drive to the extruded shafts 13', provided in accordance with my invention, and entered in the ends of the shaft 4' for drive purposes. The wheels 10' are mounted on axle studs 14' secured to and projecting outwardly from the side plates 9', the bearings 15' being preferably of the sintered powder type and insuring easy turning.

The overrunning clutch in this mower is similar to that disclosed in Figs. 1 and 2 and consists of a cam 16' cooperating with a single roller 17' disposed between the cam and the inner periphery of the shaft 4' and guided for radial movement between the turned-in end portions 18' of a split spring ring 19'. The ring 19' tends to expand, and regardless of lubricant present will exert sufficient frictional drag to keep the roller 17' from changing its location with respect to the inside of the shaft 4' while maintaining the roller in accurate longitudinal alignment with the cam 16' and shaft 4' for full length contact in the engagement of the clutch, the operation of this clutch being the same as the clutch of Figs. 1 and 2, and, therefore, requiring no detailed description.

The shaft 13', in accordance with this invention, is extruded to the same cam contour as the cam 16' from end to end, and the center holes 25 in the drive pinions 12' being made to the same contour for a press fit of these pinions on the shafts 13' so that no keys or other drive connections are needed. In other words, the extruded shafts which are obtainable at about the same cost as ordinary shafts require no machining for either the cam contour or for keyways for keying the shafts to the pinions, so that two important savings are realized. Due to the fact that more than two-thirds of the circumference of the shafts 13' is cylindrical, as clearly appears in Fig. 2A, the shafts operate smoothly in the bearings 21' provided in suitably fixed spaced relation to one another in the end portions of the shaft 4'. In assembling, the rings 19' are entered in the ends of the shaft 4' between the bearings 21' at the time these bearings are assembled in the shaft, the rollers 17' being thereafter first placed between the end portions 18' of the rings 19' before the shafts 13' are entered in the bearings holding the rollers 17' in place.

The shafts 13' are interchangeable for the right and left hand sides of the mower, thereby further reducing production problems. With that thought in mind, there are two annular grooves 26 provided in the shafts in the same spaced relationship from the ends thereof, although only one of these grooves is required in the left hand assembly for the brass washer 27 that is swedged into the outer one of the grooves to assume end thrust. The other groove 26 is located in the vicinity of the roller 17' in this left hand assembly, and is too narrow to in any way affect the operation of the overrunning clutch. That groove is used for the mounting of the washer 27 in the right hand assembly. A felt washer 28 bears against the outer face of the end thrust washer 27 and is retained in the embossed cylindrical portion 29 of the closure plate 22 and serves to seal the bearing and clutch assembly while at the same time assuming a certain amount of end thrust transmitted thereto by the washer 27, the resilience of the felt washer insuring free and easy turning of the shaft by its allowance for end tolerance. A thin flanged ferrule 30 of cylindrical form is preferably pressed onto the shaft 13' with its flanged end against the washer 27 and with the other end 31 projecting through the center hole in the embossed portion 29 of the closure plate 22, whereby to provide a smooth cylindrical bearing surface thereon for the felt washer 28 independently of the cam contour of the shaft 13'. Another felt washer 32 inserted in the inner end of each cup 8' serves to seal the other end of the bearing to exclude dirt and water. The ring indicated at 33 is a bearing cage which fits loosely around the end portion of the shaft 4' and has circumferentially spaced slots therein containing the rollers 7', whereby these rollers are retained in proper circumferentially spaced relation and are also retained against endwise displacement. It is obvious that when the nuts 34 are removed from the bolts 23, the whole clutch and bearing assembly can be easily disassembled. This makes it an easy matter to remove the whole reel whenever that may become necessary.

It is believed the foregoing description conveys a good understanding of the objects and advantages of my invention. The appended claims have been drawn to cover all legitimate modifications and adaptations.

I claim:

1. A clutch device including, in combination, a driving member and a driven member, a cam turning with the driving member within a circular housing portion turning with the driven member, a rolling drive element movable circumferentially with respect to the periphery of the cam between high and low points at opposite ends thereof, and a split ring in close frictional contact peripherally within the circular housing and having the rolling element disposed closely between the circumferentially spaced ends thereof and guided thereby for limited radial movement toward and away from frictional driving engagement with the circular housing portion.

2. A clutch device including, in combination, a driving member and a driven member, a cam turning with the driving member within a circular housing portion turning with the driven member, an elongated drive roller movable circumferentially with respect to the periphery of the cam between high and low points at opposite ends thereof, and an elongated split ring in close frictional contact peripherally within the circular housing and having the roller disposed closely between the circumferentially spaced ends thereof and held thereby in longitudinal alignment with said cam and housing and guided thereby for limited radial movement toward and away from frictional driving engagement with the circular housing portion.

3. A clutch device including, in combination, a driving member and a driven member, a cam turning with the driving member within a circular housing portion turning with the driven member, an elongated drive roller movable circumferentially with respect to the periphery of the cam between high and low points at opposite ends thereof, and an elongated split spring ring fitting by reason of spring expansion closely within the circular housing and having the circumferentially spaced ends bent inwardly in spaced parallel relation and having the roller disposed closely between said parallel end portions and held thereby in longitudinal alignment with said cam and housing and guided thereby for limited radial movement toward and away from frictional driving engagement with the circular housing portion.

4. A clutch device including, in combination, a shaft and a tubular shaft in telescoping relation, one shaft being a driver and the other driven, a cam on the inner shaft having high and low portions in circumferentially spaced relation, a rolling drive element disposed between the inner circumference of the tubular shaft and the periphery of said cam, and a split spring ring disposed within the tubular shaft encircling the cam in close frictional contact peripherally with the inner periphery of the tubular shaft by reason of spring expansion of the ring, the circumferentially spaced end portions of said ring defining guide portions in substantially parallel spaced relation close to opposite sides of said rolling element to cage the same and guide said rolling element for limited radial movement toward and away from frictional driving engagement with the inner periphery of said tubular shaft.

5. A clutch device including, in combination, a shaft and a tubular shaft in telescoping relation, one shaft being a driver and the other driven, a cam on the inner shaft having high and low portions in circumferentially spaced relation, a rolling drive element disposed between the inner circumference of the tubular shaft and the periphery of said cam, and a split spring ring disposed within the tubular shaft encircling the cam and held by spring expansion in close contact with the inner periphery of the tubular shaft, the circumferentially spaced end portions of said ring being bent inwardly to define guide portions in substantially parallel spaced relation close to opposite sides of said rolling element to cage the same and guide said rolling element for limited radial movement toward and away from frictional driving engagement with the inner periphery of said tubular shaft.

6. A clutch device including, in combination, a shaft and a tubular shaft in telescoping relation, a cam on the first shaft having high and low portions in circumferentially spaced relation, an elongated cylindrical drive roller disposed between the inner circumference of the tubular shaft and the periphery of said cam, and an elongated split ring disposed within the tubular shaft encircling the cam and in close contact with the inner surface of said tubular shaft, the circumferentially spaced end portions of said ring being bent inwardly to define elongated guide portions in substantially parallel spaced relation close to opposite sides of said roller to cage the same, so as to prevent longitudinal misalignment of the roller with respect to the tubular shaft, and guide said roller for limited radial movement toward and away from frictional driving engagement with the inner periphery of said tubular shaft.

7. A clutch device including, in combination, a shaft and a tubular shaft in telescoping relation, a cam on the first shaft having high and low portions in circumferentially spaced relation, an elongated cylindrical drive roller disposed between the inner circumference of the tubular shaft and the periphery of said cam, and an elongated split spring ring disposed within the tubular shaft encircling the cam and held by spring expansion in close contact with the inner surface of said tubular shaft, the circumferentially spaced end portions of said ring defining guide portions in substantially parallel spaced relation close to opposite sides of said roller to cage the same, so as to prevent longitudinal misalignment of the roller with respect to the tubular shaft, and guide said roller for limited radial movement toward and away from frictional driving engagement with the inner periphery of said tubular shaft.

8. A clutch device including, in combination, a shaft and a tubular shaft in telescoping relation, one shaft being a driver and the other driven, the inner shaft being of cam shaped cross-section having high and low portions in circumferentially spaced relation, a rolling drive element operatively disposed between the inner circumference of the tubular shaft and the cam periphery of said inner shaft, said inner shaft being of substantially the same cam shaped cross-section throughout its length to permit fastening a power transmitting member on the outer end thereof without a key or other drive connection, and a power transmitting member having a cam shaped center hole provided therein drivingly receiving the outer end portion of said inner shaft.

9. A clutch device including, in combination, a shaft and a tubular shaft in telescoping relation, one shaft being a driver and the other driven, the inner shaft being of cam shaped cross-section having high and low portions in circumferentially spaced relation, a rolling drive element operatively disposed between the inner circumference of the tubular shaft and the cam periphery of said inner shaft, said inner shaft being of substantially the same cam shaped cross-section throughout its length to permit fastening a power transmitting member on the outer end thereof without a key or other drive connection, a power transmitting member having a cam shaped center hole provided therein drivingly receiving the outer end portion of said inner shaft, said inner shaft having an annular groove provided therein intermediate the ends thereof, and an end thrust washer seated in said groove and arranged to have positive end thrust engagement with the end of the tubular shaft.

10. A clutch device including, in combination, a shaft and a tubular shaft in telescoping relation, one shaft being a driver and the other driven, the inner shaft being of cylindrical form throughout the major portion of its circumference and the remaining portion of the circumference being cam shaped with high and low portions in circumferentially spaced relation, bearings in the tubular shaft rotatably receiving said cam shaft, and a rolling drive element operatively disposed between the inner circumference of the tubular shaft and the cam shaped portion of the periphery of said inner shaft, said inner shaft being of substantially the same cam shaped cross-section throughout its length to permit fastening a power transmitting member on the outer end thereof without a key or other drive connection, and a power transmitting member having a cam shaped center hole provided therein drivingly receiving the outer end portion of said inner shaft.

11. A clutch device including, in combination, a shaft and a tubular shaft in telescoping relation, one shaft being a driver and the other driven, the inner shaft being of cam shaped cross-section having high and low portions in circumferentially spaced relation, a rolling drive element operatively disposed between the inner circumference of the tubular shaft and the cam periphery of said inner shaft, said inner shaft being of substantially the same cam shaped cross-section throughout its length to permit fastening a power transmitting member on the outer end thereof without a key or other drive connection, a power transmitting member having a cam shaped center hole provided therein drivingly receiving the outer end portion of said inner shaft, said inner shaft having annular grooves provided therein in equally spaced relation to the ends thereof, whereby said shaft is usable interchangeably for right and left handed installations, and an end thrust washer seated in one of said grooves and arranged to have positive end thrust engagement with the end of the tubular shaft.

12. A clutch device including, in combination, a shaft and a tubular shaft in telescoping relation, one shaft being a driver and the other driven, the inner shaft being of cylindrical form throughout the major portion of its circumference and the remaining portion of the circumference being cam shaped with high and low portions in circumferentially spaced relation, bearings in the tubular shaft rotatably receiving said cam shaft, and a rolling drive element operatively disposed between the inner circumference of the tubular shaft and the cam shaped portion of the periphery of said inner shaft, said inner shaft being of substantially the same cam shaped cross-section throughout its length to permit fastening a power transmitting member on the outer end thereof without a key or other drive connection, said inner shaft having an annular groove provided therein intermediate the ends thereof, and an end thrust washer seated in said groove and arranged to have positive end thrust engagement with the end of the tubular shaft.

13. A clutch device including, in combination, a shaft and a tubular shaft in telescoping relation, one shaft being a driver and the other driven, the inner shaft being of cylindrical form throughout the major portion of its circumference and the remaining portion of the circumference being cam shaped with high and low portions in circumferentially spaced relation, bearings in the tubular shaft rotatably receiving said cam shaft, and a rolling drive element operatively disposed between the inner circumference of the tubular shaft and the cam shaped portion of the periphery of said inner shaft, said inner shaft being of substantially the same cam shaped cross-section throughout its length to permit fastening a power transmitting member on the outer end thereof without a key or other drive connection, said inner shaft having annular grooves provided therein in equally spaced relation to the ends thereof, whereby said shaft is usable interchangeably for right and left handed installations, and an end thrust washer seated in one of said grooves and arranged to have positive end thrust engagement with the end of the tubular shaft.

14. A clutch device as set forth in claim 8, including a split ring in close frictional contact with the inner surface of said tubular shaft, and having the rolling drive element disposed closely between the circumferentially spaced ends thereof and guided thereby for limited radial movement toward and away from frictional driving engagement with the tubular shaft.

15. A clutch device as set forth in claim 9, including a split ring in close frictional contact with the inner surface of said tubular shaft, and having the rolling drive element disposed closely between the circumferentially spaced ends thereof and guided thereby for limited radial movement toward and away from frictional driving engagement with the tubular shaft.

16. A clutch device as set forth in claim 10, including a split ring in close frictional contact with the inner surface of said tubular shaft, and having the rolling drive element disposed closely between the circumferentially spaced ends thereof and guided thereby for limited radial movement toward and away from frictional driving engagement with the tubular shaft.

17. A clutch device as set forth in claim 11, including a split ring in close frictional contact with the inner surface of said tubular shaft, and having the rolling drive element disposed closely between the circumferentially spaced ends thereof and guided thereby for limited radial movement toward and away from frictional driving engagement with the tubular shaft.

18. A clutch device as set forth in claim 12, including a split ring in close frictional contact with the inner surface of said tubular shaft, and having the rolling drive element disposed closely between the circumferentially spaced ends thereof and guided thereby for limited radial movement toward and away from frictional driving engagement with the tubular shaft.

19. A clutch device as set forth in claim 13, including a split ring in close frictional contact with the inner surface of said tubular shaft, and having the rolling drive element disposed closely between the circumferentially spaced ends thereof and guided thereby for limited radial movement toward and away from frictional driving engagement with the tubular shaft.

EARL L. SCHOFIELD.

REFERENCES CITED

The following references are of record in the file of this patent:

UNITED STATES PATENTS

| Number | Name | Date |
| --- | --- | --- |
| 1,583,103 | Wagner | May 4, 1926 |
| 1,708,215 | Chryst | Apr. 9, 1929 |
| 2,196,149 | Funk | Apr. 2, 1940 |
| 2,332,061 | Conkle | Oct. 19, 1943 |

FOREIGN PATENTS

| Number | Country | Date |
| --- | --- | --- |
| 726,504 | France | Mar. 7, 1932 |